(12) United States Patent
Usui

(10) Patent No.: US 9,142,949 B2
(45) Date of Patent: Sep. 22, 2015

(54) PTC DEVICE

(75) Inventor: Hisashi Usui, Ibaraki (JP)

(73) Assignee: Tyco Electronics Japan G.K., Kawasaki-shi (JP)

( * ) Notice: Subject to any disclaimer, the term of this patent is extended or adjusted under 35 U.S.C. 154(b) by 0 days.

(21) Appl. No.: 14/235,608

(22) PCT Filed: Jul. 27, 2012

(86) PCT No.: PCT/JP2012/069214
§ 371 (c)(1),
(2), (4) Date: Sep. 18, 2014

(87) PCT Pub. No.: WO2013/018719
PCT Pub. Date: Feb. 7, 2013

(65) Prior Publication Data
US 2015/0029630 A1    Jan. 29, 2015

(30) Foreign Application Priority Data

Jul. 29, 2011  (JP) .................. 2011-167266

(51) Int. Cl.
*H01C 7/10* (2006.01)
*H02H 3/08* (2006.01)
*H01C 7/02* (2006.01)

(52) U.S. Cl.
CPC ............... *H02H 3/085* (2013.01); *H01C 7/021* (2013.01)

(58) Field of Classification Search
CPC ........ H01C 1/1406; H01C 7/021; H01C 7/02; H01C 17/02; H01C 17/06; H01C 7/008; H01C 7/027; H01C 7/028; H01C 7/12; H01C 7/13; H01C 7/18; H01C 17/00; H01C 17/0652; H01C 17/06526; H01C 17/06566; H01C 17/0658; H01C 1/01; H01C 1/016; H01C 1/028; H01C 1/08; H01C 1/14; H01C 1/1413; H01C 1/142; H01C 1/148; H01C 7/00; H01C 7/005; H01C 7/041; H01C 7/049; H01C 7/10; H01C 7/1006; H01C 7/112

USPC .................................. 338/22 R, 20
See application file for complete search history.

(56) References Cited

U.S. PATENT DOCUMENTS 4,980,541 A  * 12/1990  Shafe et al. .................... 219/548
5,378,407 A  *  1/1995  Chandler et al. .............. 252/513

(Continued)

FOREIGN PATENT DOCUMENTS

JP      2001-524747 A    12/2001
JP      2003-515245 A     4/2003

(Continued)

OTHER PUBLICATIONS

International Search Report for International Application No. PCT/JP2012/069214 mailed Nov. 6, 2012.

*Primary Examiner* — Kyung Lee

(57) ABSTRACT

The present invention provides a PTC device having a laminate which includes a PTC component having a laminar PTC element defined by main surfaces which are facing each other, laminar electrodes extending on the main surfaces, and a first insulation layer, the PTC component, and a second insulation layer laminated in this listed order. The laminate has a first end and a second end, and a first side electrode and a second side electrode are disposed on the first end and the second end, respectively; one of laminar electrodes of the PTC component extends while being separated from the first side electrode and the second side electrode; the other is separated from the first end, and extends to the second end and is electrically connected to the second side electrode. At least the first side electrode extends at the first end along an entirety of a thickness direction of the laminate and further extends on a first edge portion of one of the insulation layers; and the first edge portion has a through-hole which reaches the one laminar electrode. The through-hole has an electrically conductive element which electrically connects the one laminar electrode and the first side.

6 Claims, 5 Drawing Sheets

(56) References Cited

U.S. PATENT DOCUMENTS

| | | | |
|---|---|---|---|
| 5,900,800 A * | 5/1999 | McGuire et al. | 338/22 R |
| 6,023,403 A | 2/2000 | McGuire et al. | |
| 6,377,467 B1 | 4/2002 | Chu et al. | |
| 6,640,420 B1 | 11/2003 | Hetherton et al. | |
| 8,421,584 B2 * | 4/2013 | Tsai et al. | 338/22 R |
| 8,502,638 B1 * | 8/2013 | Sha et al. | 338/22 R |
| 8,576,043 B2 * | 11/2013 | Liu et al. | 338/22 R |
| 8,830,027 B2 * | 9/2014 | Sha et al. | 338/22 R |
| 8,933,775 B2 * | 1/2015 | Wang et al. | 338/22 R |
| 8,941,462 B2 * | 1/2015 | Lee et al. | 338/22 R |
| 2002/0130757 A1 * | 9/2002 | Huang et al. | 338/22 R |
| 2005/0140492 A1 * | 6/2005 | Chu et al. | 338/22 R |
| 2006/0055501 A1 | 3/2006 | Burke et al. | |
| 2007/0146112 A1 * | 6/2007 | Wang et al. | 338/22 R |
| 2010/0134942 A1 * | 6/2010 | Wang et al. | 361/93.7 |
| 2011/0175700 A1 | 7/2011 | Bourns et al. | |
| 2013/0187748 A1 * | 7/2013 | Sha et al. | 338/22 R |

FOREIGN PATENT DOCUMENTS

| | | |
|---|---|---|
| JP | 2006-510204 A | 3/2006 |
| JP | 2009-533880 A | 9/2009 |

* cited by examiner

PTC DEVICE

FIELD OF THE INVENTION

The present invention relates to a PTC device which comprises a laminate wherein insulation layers are laminated on both sides of a PTC component, and specifically relates to such a PTC device which is able to be surface mounted.

BACKGROUND OF THE INVENTION

The PTC device as described above is widely used as a protection device to protect electrical elements constituting various electrical apparatuses, for example a secondary battery cell, or circuits constituting electrical apparatuses when an excessive current flows through the electrical apparatuses. The PTC device is also widely used as a protection device to interrupt an electrical current flowing through the electrical apparatus when the electrical element fails, as a result of which a temperature of the electrical apparatus rises abnormally high.

Such PTC device is disclosed, for example, in the Patent Reference 1 shown below, an example of which is shown in FIG. 8 as a schematic cross-sectional view. The PTC device 200 comprises a PTC component 212 and a first insulation layer 214a and a second insulation layer 214b which are disposed on both sides thereof. The PTC component 212 comprises a PTC element 210 and a first laminar electrode 212a and a second laminar electrode 212b which are disposed on both sides thereof. The laminar electrode 212a is connected to a first side electrode 220, and the laminar electrode 212b is connected to a second side electrode 222. In the PTC device, the first side electrode 220 and the second side electrode 222 are formed of metal plated layers.

The first side electrode 220 is formed by integrating, in addition to an electrode section present at one end of the PTC element 210 along its thickness direction, an electrode section 216 which is positioned on a section of said one end of the first insulation layer 214a and an electrode section 216 which is positioned on a section of said one end of the second insulation layer 214b together. The second side electrode 222 is formed by integrating, in addition to an electrode section present at the other end of the PTC element 210 along its thickness direction, an electrode section 218 which is positioned on a section of said other end of the first insulation layer 214a and an electrode section 218 which is positioned on a section of said the other end of the second insulation layer 214b together. The intermediate regions between the electrode sections 216 and 218 are coated with solder masks 224a and 224b (insulating bodies).

U.S. Pat. No. 6,377,467 is a prior patent reference.

SUMMARY OF THE INVENTION

When using the PTC device described above, it has been found that there occurs problem in that the device may not operate appropriately when its operation time increases. As a result of studying this problem, it has been concluded that the cause of the problem is that the metal plated layer tended to peel at the connection portion between the laminar electrode of the PTC component and the metal plated layer as the side electrode. Thus, there comes an idea in that it is desirable to avoid the peeling problem due to the metal plated layer by providing a PTC device which has a new construction instead of the PTC device as described above.

As a result of considering the PTC device having the above construction while taking into account the above problem, it has been found that the above problem would be suppressed by electrically and directly connecting the electrode section which is positioned on the edge portion of the insulation layer and the laminar electrode of the PTC component directly, thus reaching the present invention. This direct electrical connection may be performed by forming a through-hole that directly connects the electrode section and the laminar electrode through the insulation layer and providing an electrically conductive element in this through-hole. More specifically, this may be performed by providing an electrically conductive metal layer (for example, a plated layer) on the wall defining the through-hole. In other embodiment, this may be performed by filling an electrically conductive material such as an electrically conductive paste in the through-hole.

Therefore, in the first aspect, the present invention provides a PTC device comprising a laminate which comprises:

a PTC component which comprises a laminar PTC element defined by a first main surface and a second main surface which are facing to each other, a first laminar electrode extending on the first main surface, and a second laminar electrode extending on the second main surface, and a first insulation layer which is positioned on the first main surface via the first laminar electrode, and a second insulation layer which is positioned on the second main surface via the second laminar electrode, and in which the first insulation layer, the PTC component, and the second insulation layer are laminated in this listed order wherein:

the laminate has a first end and a second end with respect to a direction perpendicular to a laminating direction (i.e., to a vertical direction), and a first side electrode and a second side electrode are disposed on the first end and the second end, respectively;

the first laminar electrode of the PTC component extends while being separated from the first side electrode and the second side electrode;

the second laminar electrode of the PTC component is separated from the first end, and extends to the second end and is electrically connected to the second side electrode;

at least the first side electrode extends at the first end along the entire thickness direction of the laminate and further extends on a first edge portion of the first insulation layer; and the first edge portion has a through-hole (also called a via-hole) which reaches the first laminar electrode, and the through-hole has an electrically conductive element which electrically connects the first laminar electrode and the first side electrode.

In the second subject matter, the present invention provides an electrical apparatus which comprises the PTC device of the present invention described above and below. Such an electrical apparatus includes a battery pack, a user interface such as a USB and HDMI, and the like. The PTC device of the present invention functions as a circuit protection device, an overheat protection device, or the like.

In the PTC device of the present invention, the laminar electrode of the PTC component is electrically connected to the side electrode via the through-hole provided through the insulation layer and the electrically conductive element positioned therein. Thus, the connection portion at the laminar electrode is a contacting surface with a bottom of the through-hole. As a result, compared with a direct connection of the laminar electrode to the side electrode which connection is substantially in a line contact, the connection is performed with a surface contact in the PTC device of the present invention, which results in a larger area of the connection portion.

The area of the connection portion can be further enlarged with enlarging a diameter of the through-hole and/or increasing the number of the through-hole. Furthermore, since the electrically conductive element is separated from the PTC element in addition to that the area of the connection portion is larger, mechanical stress which is generated by the volume expansion or contraction of the PTC element when the PTC component is activated by overcurrent or overheating can be alleviated, and therefore, it is thought that a more appropriate maintenance of such electrical connections may be secured.

DETAILED DESCRIPTION OF THE INVENTION

Figure 1:
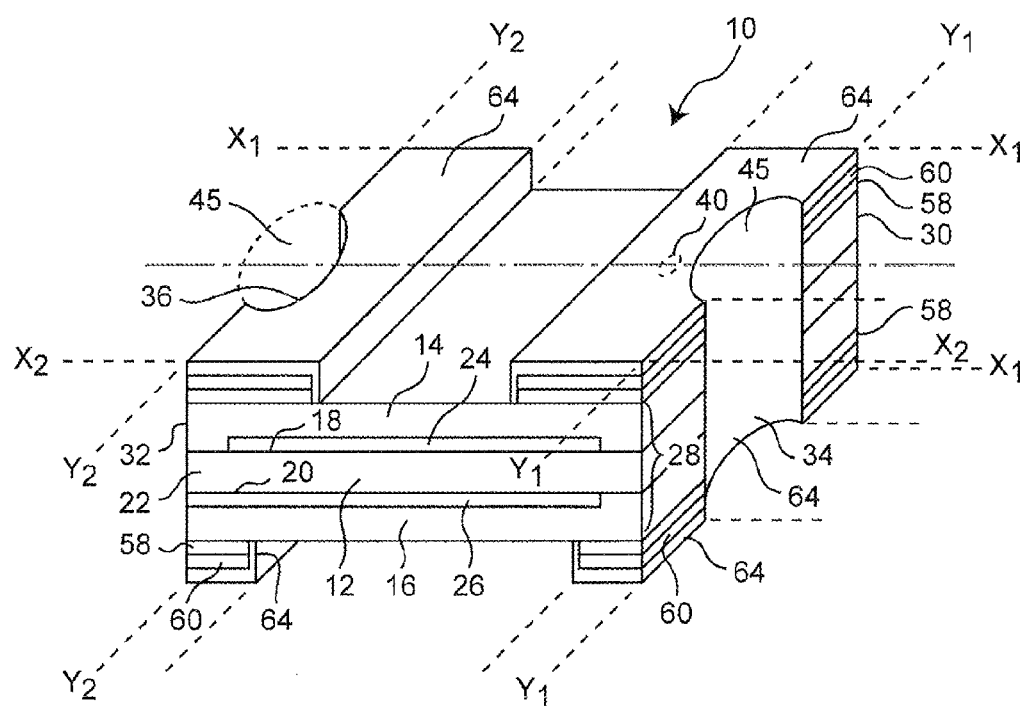
FIG. 1 schematically shows a first embodiment of the PTC device of the present invention in a perspective view.

Next, the PTC device of the present invention is described in more detail with reference to the drawings. FIG. 1 schematically shows one preferred embodiment of the PTC device of the invention in a perspective view, and FIG. 2 schematically shows a cross-section of the PTC device which is formed when it is cut with a vertical cross-section containing the center line shown by the single-dot chain line in FIG. 1.

The PTC device 10 shown in FIG. 1 comprises a PTC component 12, and a first insulation layer 14 which is positioned above it and a second insulation layer 16 which is positioned below it. The PTC component 12 comprises a laminar PTC element 22 defined by a first main surface 18 and a second main surface 20 which are opposed to each other, and a first laminar electrode 24 which extends on the first main surface 18 and a second laminar electrode 26 which extends on the second main surface 20. Therefore, the PTC device 10 comprises a laminate 28 in which the first insulation layer 14, the PTC component 12, and the second insulation layer 16 are laminated in thus listed order, the first insulation layer 14 is positioned on the first main surface 18 via the first laminar electrode 24 and the second insulation layer 16 is positioned on the second main surface 20 via the second laminar electrode 26.

Figure 2:
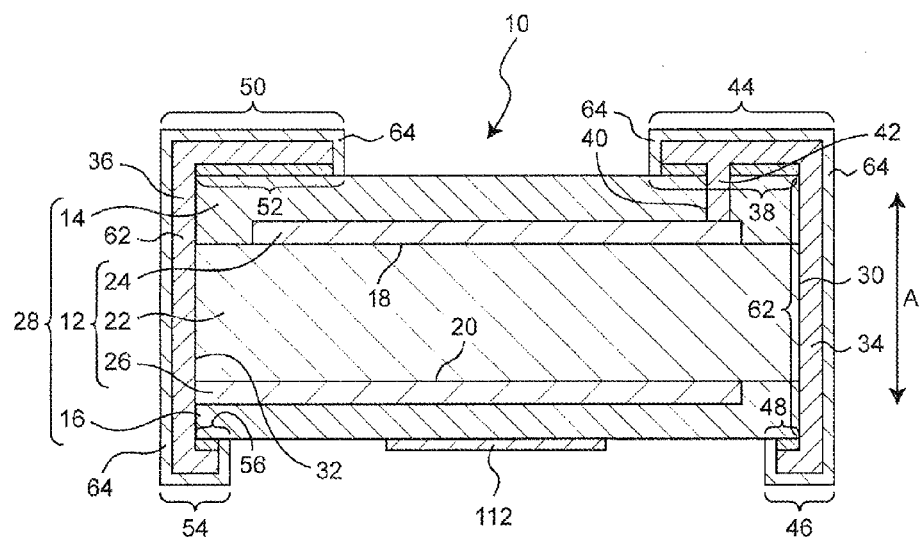
FIG. 2 schematically shows the PTC device shown in FIG. 1 in a cross-sectional view.

The laminate 28 has a first end 30 and a second end 32 with respect to a direction perpendicular to the laminating direction (i.e. a vertical direction shown with an arrow "A" in FIG. 2). A first side electrode 34 and a second side electrode 36 are disposed on the first end 30 and the second end 32, respectively.

As illustrated, the first laminar electrode 24 of the PTC component 12 is separated from the first side electrode 34 and the second side electrode 36, and the second laminar electrode 26 of the PTC component 12 is separated from the first side electrode 34 while extending to the second end 32 and being electrically connected to the second side electrode 36 (more specifically, the section in the thickness direction of the laminate as described later).

The first side electrode 34 extends at the first end 30 along the entirety of the thickness direction of the laminate 28, and further extends on a first edge portion 38 of the first insulation layer 14. The first edge portion 38 has a through-hole 40 (also referred to as a via-hole) which reaches the first laminar electrode 24, and the via-hole 40 has an electrically conductive element 42 which electrically connects the first laminar electrode 24 and the first side electrode 34. The electrically conductive element 42 may be a metal plated layer which is formed on the inner wall which defines the via-hole 40. In an other embodiment, the electrically conductive element 42 may be an electrically conductive composition, for example, a solder adhesive, a solder paste, an electrically conductive adhesive, or the like which is filled within the via-hole 40.

In the illustrated embodiment, in the PTC device 10, the first side electrode 34 extends not only along the thickness direction of the laminate, but also a portion 44 of the electrode 34 extends along the first edge portion 38 of the first insulation layer 14, and other portion 46 of the electrode 34 extends along the first edge portion 48 of the second insulation layer 16. Similarly to the first side electrode, the second side electrode 36 also extends not only along the thickness direction of the laminate, but also a portion 50 of the electrode 36 extends along the second edge portion 52 of the first insulation layer 14, and other portion 54 of the electrode 36 extends along the second edge portion 56 of the second insulation layer 16.

With respect to the edge portions of the insulation layer, both side electrodes are constituted of a metal foil 58 which is thermal-compressed on the edge portion and a copper layer 60 which is plated on the metal foil. With respect to the portions 62 along the thickness direction of the laminate, the side electrodes are formed of a copper layer plated on the laminate. In the illustrated embodiment, such side electrodes are covered by an Ni/Sn layer 64 formed by for example plating, so that they are not exposed as they are. It is noted that with respect to the thickness direction of the laminate, plated layers are formed only on the portions which form a concave sections at the ends. Therefore, in the illustrated embodiment, each of the side electrodes is constituted of a portion 62 in the thickness direction of the laminate (it is noted that only the concave section is related), the portion 44 and the portion 46.

The illustrated PTC device has one via-hole 40, but the number of the via-holes is not particularly limited and a plurality of the via-holes, for example two or more via-holes, may be provided. Furthermore, the location where the via-hole is formed is not particularly limited, and from the standpoint of making a rated voltage of the PTC device large, it is preferred that the via-hole is provided in a location close to the side electrode. For example, in FIG. 1, the via-holes may be provided at one location at the near side and at the far side, respectively with respect to the single-dot chain line, i.e. in two locations.

The illustrated PTC device 10 may be produced by any appropriate method whereby the constituent elements of the PTC device may be formed in the order to be composed as illustrated. It is noted that all the elements constituting the PTC device of the present invention are known and those skilled in the art may select appropriate materials and appropriate methods to form each element.

For example, it is convenient to produce a plurality of the PTC devices of the present invention which are separately divided into each device by forming an aggregation of the PTC devices in which many of the illustrated PTC devices are arranged adjacently like a matrix (as shown by the broken lines in FIG. 1), cutting the aggregation along the plane containing the lines shown with "X1", cutting along the plane containing the lines shown with "X2", then cutting along the plane containing the lines shown with "Y1", and finally cutting along the plane containing the lines shown with "Y2".

More specifically, the aggregation of the PTC devices can be formed for example in the following way: Firstly, metal foils which form the laminar electrodes 24 and 26 are superposed on the main surfaces of both sides of an extruded sheet of a PTC composition which forms the laminar PTC element 22, and they are thermal-compressed together to be integral to prepare a PTC component precursor sheet (also referred to as a "plaque"). The metal foils on both sides of the precursor sheet are removed by etching as prescribed to expose the prescribed portions of the laminar PTC element 22 such that an aggregation of the first laminar electrode and an aggregation of the second laminar electrode of the PTC aggregate are formed. In other words, as shown in FIG. 2, with respect to the first laminar electrode 24, a side portion of the first end 30 and a side portion of the second end 32 of the laminar PTC element 22 are exposed, and with respect to the second laminar electrode 26, only a side portion of the first end 30 of the laminar PTC element 22 is exposed.

Then, prepreg sheets which form the first insulation layer 14 and the second insulation layer 16 respectively are laminated on both sides of the precursor sheet to form an aggregate of laminate, metal foils are superposed on the aggregate each of which foils finally constituting portions of the first side electrode (portions 44 and 46) and portions of the second side electrode (portions 50 and 54) on the edges of the first insulation layer and the second insulation layer of the laminate, and the aggregate and the foils are heated to melt and harden the prepreg sheet to be thermal-compressed together.

Next, through-hole parts 45 each having a circular cross-section (see FIG. 1) are formed, for example by using a mechanical drill so as to form wall sections on which the first side electrode 34 and the second side electrode 36 extending along the thickness direction of the laminate are formed. The via-holes 40 are formed at prescribed positions by melting the prepreg layer, for example with a $CO_2$ laser irradiation followed by a desmear treatment (residue removing treatment). Then, the entirety of the precursor sheet is copper-plated to form copper layers on the metal foils. By this copper plating, the portion 62 of the first side electrode and the portion 62 of the second side electrode are formed as the copper layers which portions extend at both ends of the laminate along the thickness direction of the laminate. It is noted that the copper layer is also formed on the outermost part of the precursor sheet (which eventually constitute the portions 44, 46, 50, and 54), and the copper layer is also formed on the wall section defining the via hole 40, which functions as the electrically conductive element 42. It is noted that depending on the size of the via-hole, the electrically conductive element 42 may be in a state where the via-hole is filled with copper.

Next, depending on the prescribed shapes of the first side electrode and the second side electrode which are positioned on the first edge portion and the second edge portion of the first insulation layer and the second insulation layer of the PTC device, the copper plated layers and the metal foils below they are removed by etching to obtain the precursor sheet wherein the insulation layers are exposed in prescribed shapes. Finally, if necessary, the entirety of the precursor sheet is plated for example with Ni/Sn to obtain the first side electrode and the second side electrode wherein Ni/Sn layers 64 are formed on the exposed copper plated layers, and thereby completing the PTC device aggregate. By thus performing plating, substrate-mounting using solder becomes easy, so that automatic mounting and reflow soldering of the device of the present invention become performable, which contributes to cost reduction in substrate mounting in addition to high reliability of connection with a solder. It is noted that no plated layer is formed on the exposed insulation layers because their exposed areas are large. The completed PTC device aggregate is divided along the plane containing the broken lines "X1", the plane containing the broken lines "X2", the plane containing the broken lines "Y1", and the plane containing "Y2" shown in FIG. 1 as described above to obtain individual PTC devices of the present invention.

Figure 3:
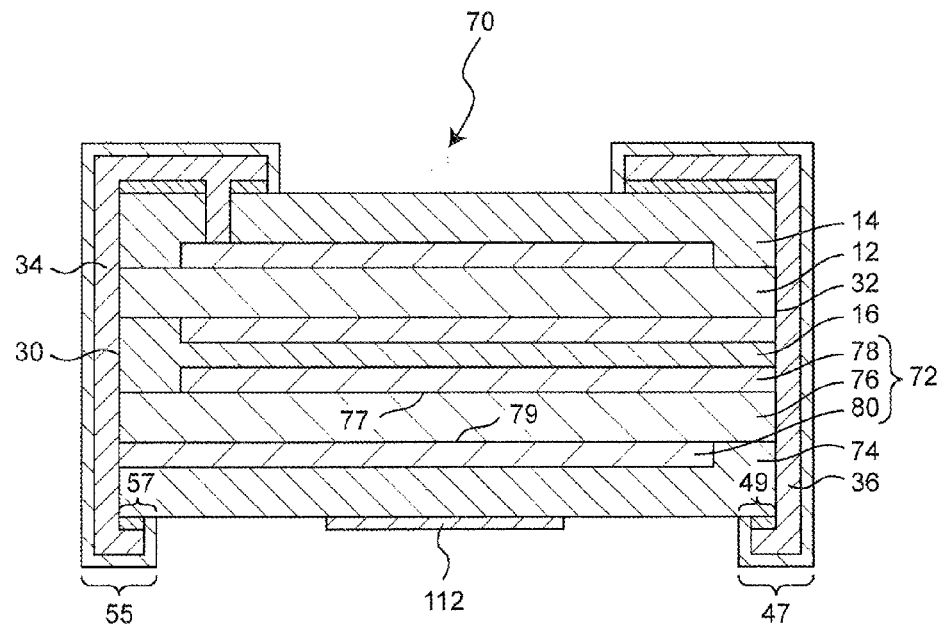
FIG. 3 schematically shows a further embodiment of the PTC device of the present invention in a cross-sectional view.

FIG. 3 schematically shows a further embodiment of a PTC device 70 of the present invention similarly to FIG. 2. In FIG. 3, there are elements which have no reference numeral, and these elements are substantially the same as those which correspond to in FIG. 2. Compared with the PTC device shown in FIG. 2, the embodiment shown in FIG. 3 essentially differs in that other PTC component 72 is disposed below the PTC component 12, an third insulation layer 74 is disposed below and adjacent to the component 72, and they also constitute the laminate 28. Similarly to the PTC component 12, this other PTC component 72 comprises a PTC element 76 and a third laminar electrode 78 and a fourth laminar electrode 80 which are respectively disposed on a third main surface 77 and a fourth main surface 79 of the PTC element 76 which are facing to each other. As clearly understood, in this laminate 28, the first insulation layer 14, the PTC component 12 and the second insulation layer 16, as well as the other PTC component 72 which is positioned on the second insulation layer and the third insulation layer 74 adjacent thereto are laminated in this order, as a result of which every PTC component is sandwiched by the insulation layers.

It is noted that in the embodiment shown in FIG. 3, the first side electrode 34 is positioned on the left side of the drawing, the second side electrode 36 is positioned on the right side of the drawing; the fourth laminar electrode 80 of the other PTC component 72 extends to the first end 30 of the laminate and is electrically connected to the first side electrode 34 while being separated from the second end 32; the third laminar electrode 78 is separated from the first end 30 of the laminate while extending to the second end 32 and being electrically connected to the second side electrode 36. As a result, the two PTC components 12 and 72 are connected electrically in parallel.

The number of the other PTC component as described above is one in the embodiment shown in FIG. 3, but it may be two or more (for example three, four or more). In this case, the insulation layer is present adjacent to such other PTC components, as a result of which, every PTC component is sandwiched by the insulation layers. For example, at least one PTC component is disposed between the PTC component 12 and the other PTC component 72 and they are constructed so that every PTC component is sandwiched by the insulation layers.

With respect to all of the PTC components, one of the laminar electrodes is electrically connected to the first side electrode and the other is electrically connected to the second side electrode, as a result of which, these PTC components are connected electrically in parallel. By thus connecting the PTC components in parallel, rated current value/a rated voltage value of the PTC device become multiples of a rated current value/a rated voltage value of each of the PTC component wherein the multiple number is equal to the number of the PTC components. It is noted that except for the essential differences described above, the embodiment shown in FIG. 3 is similar to the PTC component shown in FIG. 2.

Figure 4:
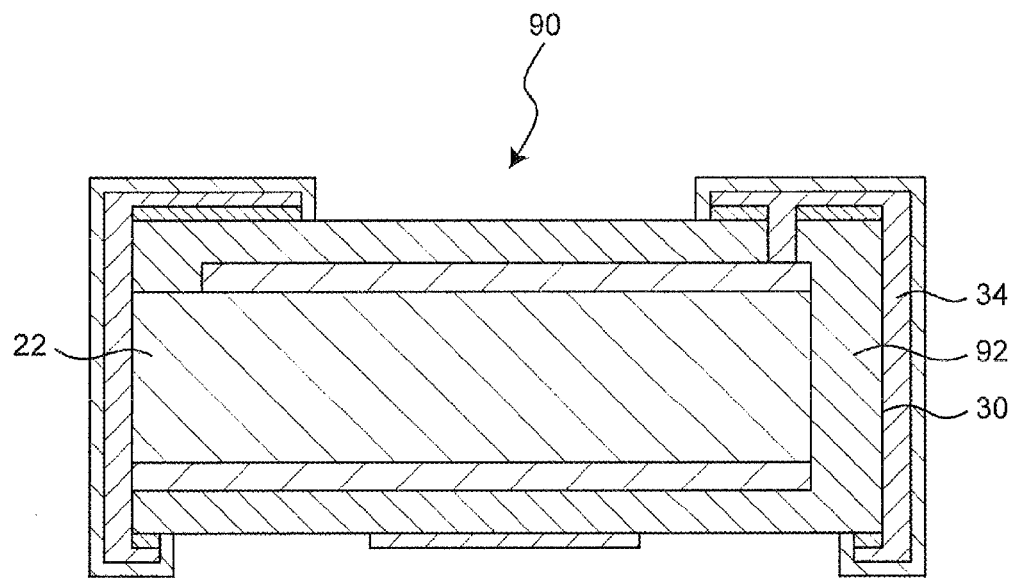
FIG. 4 schematically shows a further embodiment of the PTC device of the present invention in a cross-sectional view.

FIG. 4 schematically shows a further embodiment of a PTC device 90 of the present invention similarly to FIG. 2. In FIG. 4, there are elements which have no reference numeral, and these elements are substantially the same as those which correspond to in FIG. 2. Compared with the PTC device shown in FIG. 2, the embodiment shown in FIG. 4 essentially differs in that the laminar PTC element 22 of the PTC component 12 is separated from the first side electrode 34 by an insulation section 92 at the first end 30 of the laminate 28.

It is noted that after forming the PTC component precursor sheet, the through-holes are formed in the portions which correspond to the insulation sections 92 then prepreg sheets which constitutes the first insulation layer and the second insulation layer are laminated on both sides of the precursor sheet to form an aggregation of the laminates, then metal foils are superposed thereon, and these are thermal-compressed to be integral by heating them and melting and hardening the prepreg sheets, and thereby the melted resin of the prepreg sheets enters the through-holes to form the insulation sections 92.

Figure 5:
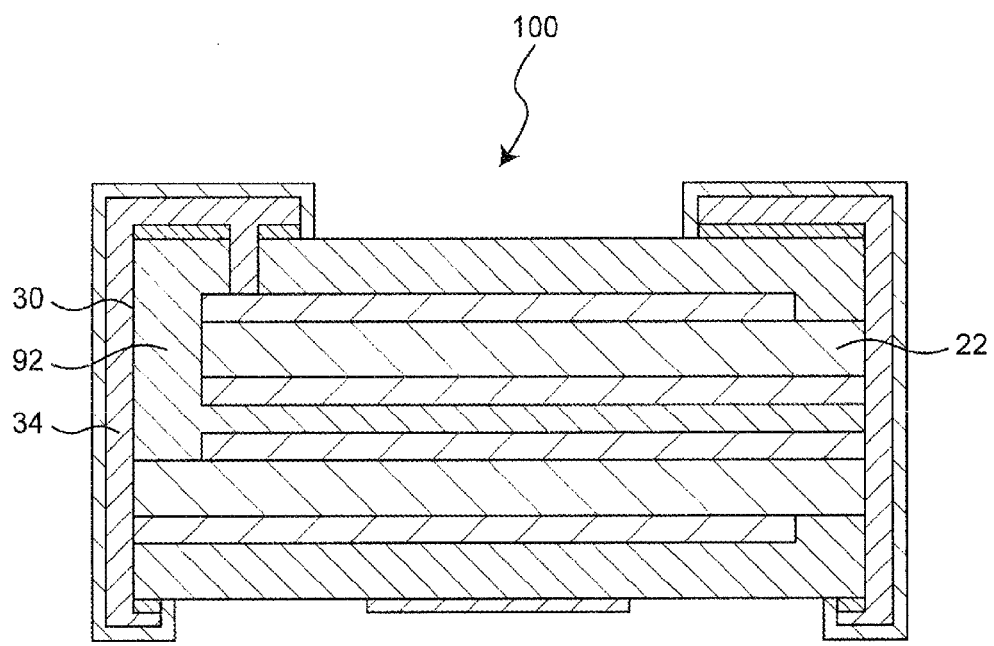
FIG. 5 schematically shows a further embodiment of the PTC device of the present invention in a cross-sectional view.

FIG. 5 schematically shows a further embodiment of a PTC device 100 of the present invention similarly to FIG. 3. In FIG. 5, there are elements which have no reference numeral, and these elements are substantially the same as those which correspond to in FIG. 3. Compared with the PTC device shown in FIG. 3, the embodiment shown in FIG. 5 essentially differs in that the laminar PTC element 22 of the PTC component 12 is separated from the first side electrode 34 by the insulation section 92 at the first end 30 of the laminate 28. This insulation section 92 may be the same as that previously described with reference to FIG. 4.

Figure 6:
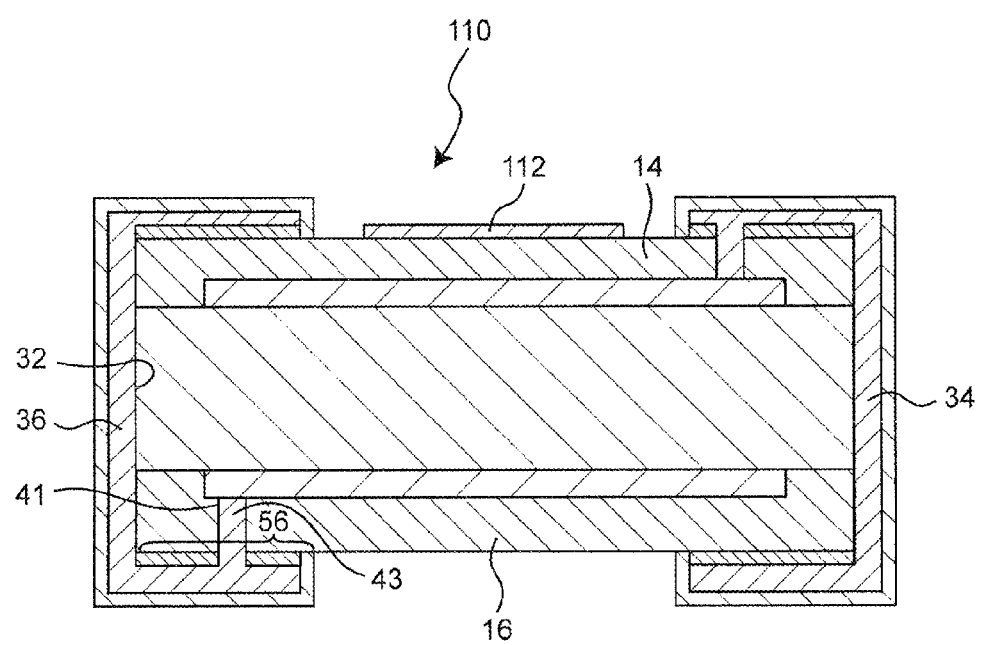
FIG. 6 schematically shows a further embodiment of the PTC device of the present invention in a cross-sectional view.

FIG. 6 schematically shows a further embodiment of a PTC device 110 of the present invention similarly to FIG. 2. In FIG. 6, there are elements which have no reference numeral, and these elements are substantially the same as those which correspond to in FIG. 2. Compared with the PTC device shown in FIG. 2, the embodiment shown in FIG. 6 essentially differs in that the second laminar electrode 26 is separated from the second side electrode 36; the second side electrode 36 extends along the entire thickness direction of the laminate at the second end 32 of the laminate 28 and further extends on the second end portion 56 of the second insulation layer 16; the second edge portion 56 has a second through-hole 41 (also referred to as a via hole) which reaches the second laminar electrode 26; and the via hole has an electrically conductive element 43 which electrically connects the second laminar electrode 26 and the second side electrode 36. In other words, the second side electrode 36 is constituted substantially similarly to the first side electrode 34.

In the embodiment shown in FIG. 6, since all of the lengths of the electrode portion 44 on the first edge portion 38 of the first insulation layer 14 and the electrode portion 50 on the second edge portion 52 as well as the electrode portion 46 on the first edge portion 48 of the second insulation layer 16 and the electrode portion 54 on the second edge portion 56 are substantially the same, a front side and a back side of the PTC device may not easily be determined from the outward appearance of the PTC device. In order to facilitate this determination, it is effective to provide a mark (marking) on an exposed surface of one of the insulation layers. In the embodiment shown in FIG. 6, such marking 112 is provided on the exposed surface of the first insulation layer 14. It is noted that the PTC devices shown in FIGS. 2-5 are also provided with the markings 112. In these embodiments, though the determination of the front side and the back side of the PTC device is easy since the lengths of the electrode portion 44 on the first edge portion 38 of the first insulation layer 14 and the electrode portion 50 on the second edge portion 52 are clearly longer than the lengths of the electrode portion 46 (or 47) on the first edge portion 48 (or 49) of the second insulation layer 16 (or the outer insulation layer 74 adjacent to the outermost other PTC component 72) and the electrode portion 54 (or 55) of the second edge portion 56. In order to make sure, these PTC devices are also provided with the marking 112.

Figure 7:
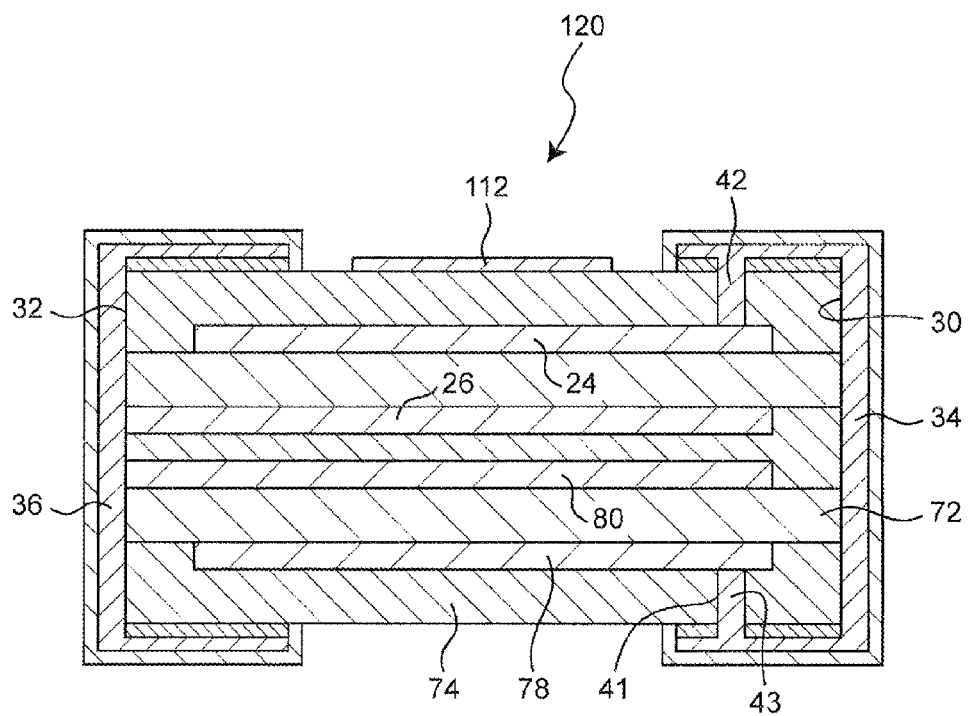
FIG. 7 schematically shows a further embodiment of the PTC device of the present invention in a cross-sectional view.
Figure 8:
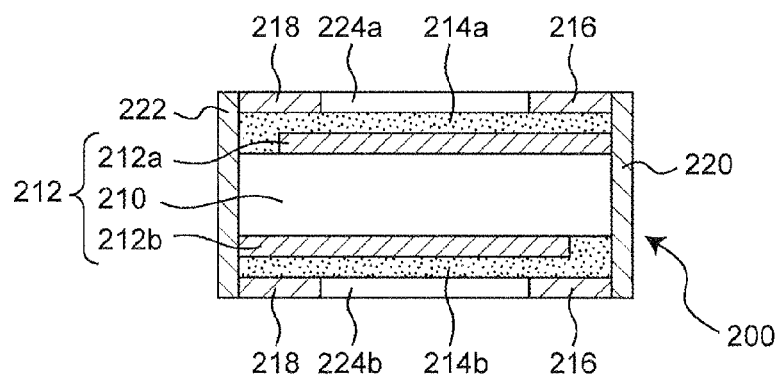
FIG. 8 schematically shows the PTC device of the prior art in a cross-sectional view.

FIG. 7 schematically shows a further embodiment of a PTC device 120 of the present invention similarly to FIG. 3. In FIG. 7, there are elements which have no reference numeral, and these elements are substantially the same as those which correspond to in FIG. 3. Compared with the PTC device shown in FIG. 3, the embodiment shown in FIG. 7 essentially differs in that an insulation layer 74 is present on the outside of the other PTC component 72 via the third laminar electrode 78, and the third laminar electrode 78 is connected to the first side electrode 34 via the electrically conductive element 43 provided in the via hole 41. This third laminar electrode 78 is separated from the first side electrode 34 and the second side electrode 36 similarly to the first laminar electrode 24, and the fourth laminar electrode 80 on the inside of the other PTC component 72 is separated from the first side electrode 34 while extending to the second end 32 and being electrically connected to the second side electrode 36 similarly to the second laminar electrode 26. As a result, the first laminar electrode 24 and the third laminar electrode 78 are connected to the first side electrode 34 via the electrically conductive elements 42 and 43 respectively, while the second laminar electrode 26 and the fourth laminar electrode 80 are connected to the second side electrode 36.

In the embodiment shown in FIG. 7, the third laminar electrode 78 is connected to the first side electrode 34 by providing the through-hole 41 and the electrically conductive element 43 in the first edge portion of the third insulation layer 74. Instead of this embodiment, the through-hole 41 and the electrically conductive element 43 may be provided in the second edge portion of the third insulation layer 74. In this case, the third laminar electrode 78 of the outermost PTC component is connected to the second side electrode 36. In such case, the fourth laminar electrode 80 needs to be separated from the second side electrode 36 and connected to the first side electrode 34.

It is noted that two or more other PTC components may be present. In this case, the characteristics of the third laminar electrode 78 described above are applicable to the outermost other PTC component, and with respect to each of the other PTC component(s) other than the outermost other PTC component, one of the laminar electrodes is separated from the second end, extends to the first end and is electrically connected to the first side electrode, and the other laminar electrode is separated from the first end, extends to the second end and is electrically connected to the second side electrode.

THE ELEMENT REFERENCE NUMBERS ARE

10—PTC device;
12—PTC component;
14—first insulation layer;
16—second insulation layer;
18—first main surface;
20—second main surface;
22—laminar PTC element;
24—first laminar electrode;
26—second laminar electrode;
28—laminate;
30—first end;
32—second end;

34—first side electrode;
36—second side electrode;
38—first edge portion;
40—through-hole;
41—second through-hole;
42—electrically conductive element;
43—electrically conductive element;
44—electrode portion;
45—through-hole part;
46,47—electrode section;
48,49—first edge portion;
50—electrode section;
52—second edge portion;
54,55—electrode section;
56—second edge portion;
58—metal foil;
60—copper layer;
62—portion along the thickness direction of the laminate;
64—Ni/Sn layer;
70—PTC device;
72—PTC component;
74—third insulation layer;
76—PTC element;
77—third main surface;
78—third laminar electrode;
79—fourth main surface;
80—fourth laminar electrode;
90—PTC device;
92—insulation section;
100—PTC device;
110—PTC device,
112—marking;
120—PTC device;
200—PTC device;
210—PTC element;
212—PTC component;
212a—first laminar electrode;
212b—second laminar electrode;
214a—first insulation layer;
214b—second insulation layer;
216—electrode section;
218—electrode section;
220—first side electrode;
222—second side electrode;
224a,224b—solder mask.

What is claimed is:

1. A PTC device comprising a laminate which comprises:
a PTC component which comprises a laminar PTC element defined by a first main surface and a second main surface which are facing each other, a first laminar electrode extending on the first main surface, and a second laminar electrode extending on the second main surface, and
a first insulation layer which is positioned on the first main surface via the first laminar electrode, and a second insulation layer which is positioned on the second main surface via the second laminar electrode, and in which the first insulation layer, the PTC component, and the second insulation layer are laminated in the listed order,
wherein:
the laminate has a first end and a second end with respect to a direction perpendicular to a laminating direction, and a first side electrode and a second side electrode are disposed on the first end and the second end, respectively;
the first laminar electrode of the PTC component extends while being separated from the first side electrode and the second side electrode;
the second laminar electrode of the PTC component is separated from the first end, and extends to the second end and is electrically connected to the second side electrode;
at least the first side electrode extends at the first end along an entirety of a thickness direction of the laminate and further extends on a first edge portion of the first insulation layer; and
the first edge portion has a through-hole which reaches the first laminar electrode, and the through-hole has an electrically conductive element which electrically connects the first laminar electrode and the first side electrode,
characterized in that:
the PTC device comprises the laminate which further comprises at least one other PTC component which comprises an other laminar PTC element defined by a third main surface and a fourth main surface which are facing each other, a third laminar electrode extending on the third main surface, and a fourth laminar electrode extending on the fourth main surface, and
in which the first insulation layer, the PTC component, and the second insulation layer, as well as the at least one other PTC component which is positioned on the second insulation layer, and an other insulation layer adjacent to each of the at least one other PTC component are laminated in the listed order, as a result of which every PTC component is sandwiched by the insulation layers;
wherein:
the third laminar electrode of each of the at least one other PTC component is separated from the first end, extends to the second end, and is electrically connected to the second side electrode; and
the fourth laminar electrode of each of the at least one other PTC component is separated from the second end, extends to the first end, and is electrically connected to the first side electrode.

2. The PTC device according to claim 1, characterized in that the laminar PTC element of the PTC component is separated from the first side electrode by an insulation section at the first end of the laminate.

3. A PTC device comprising a laminate which comprises:
a PTC component which comprises a laminar PTC element defined by a first main surface and a second main surface which are facing each other, a first laminar electrode extending on the first main surface, and a second laminar electrode extending on the second main surface, and
a first insulation layer which is positioned on the first main surface via the first laminar electrode, and a second insulation layer which is positioned on the second main surface via the second laminar electrode, and in which the first insulation layer, the PTC component, and the second insulation layer are laminated in the listed order,
wherein:
the laminate has a first end and a second end with respect to a direction perpendicular to a laminating direction, and a first side electrode and a second side electrode are disposed on the first end and the second end, respectively;
the first laminar electrode of the PTC component extends while being separated from the first side electrode and the second side electrode;
the second laminar electrode of the PTC component is separated from the first end, and extends to the second end and is electrically connected to the second side electrode;

at least the first side electrode extends at the first end along an entirety of a thickness direction of the laminate and further extends on a first edge portion of the first insulation layer; and the first edge portion has a through-hole which reaches the first laminar electrode, and the through-hole has an electrically conductive element which electrically connects the first laminar electrode and the first side electrode, characterized in that:

the PTC device comprises the laminate which further comprises at least one other PTC component which comprises an other laminar PTC element defined by a third main surface and a fourth main surface which are facing to each other, a third laminar electrode extending on the third main surface, and a fourth laminar electrode extending on the fourth main surface, and in which the first insulation layer, the PTC component, and the second insulation layer, as well as the at least one other PTC component which is positioned on the second insulation layer, and an other insulation layer adjacent to each of the at least one other PTC component are laminated in the listed order, as a result of which every PTC component is sandwiched by the insulation layers;

wherein:

the third laminar electrode of each of the at least one other PTC component other than the PTC component positioned at the outermost of the laminate is separated from the first end, extends to the second end, and is electrically connected to the second side electrode;

the fourth laminar electrode of each of the at least one other PTC component other than the PTC component positioned at the outermost of the laminate is separated from the second end, extends to the first end, and is electrically connected to the first side electrode;

the PTC component positioned at the outermost of the laminate has a third insulation layer on the outer side of its PTC element via the third laminar electrode, and the third laminar electrode is separated from the first side electrode and the second side electrode;

the fourth laminar electrode on the inner side of the PTC component positioned at the outermost of the laminate is separated from the first side electrode, extends to the second end, and is electrically connected to the second side electrode;

the first side electrode extends at the first end along the thickness direction of the laminate and further extends on the first edge portion of the first insulation layer and the third insulation layer; and the first edge portion of the third insulation layer has a through-hole which reaches the third laminar electrode, and the through-hole has an electrically conductive element which electrically connects the third laminar electrode and the first side electrode.

4. The PTC device according to claim 3, characterized in that at least one of the laminar PTC elements of the PTC component and the other PTC component is separated from the first side electrode or the second side electrode with an insulation section at the first end or the second end of the laminate.

5. A PTC device comprising a laminate which comprises:
a PTC component which comprises a laminar PTC element defined by a first main surface and a second main surface which are facing each other, a first laminar electrode extending on the first main surface, and a second laminar electrode extending on the second main surface, and a first insulation layer which is positioned on the first main surface via the first laminar electrode, and a second insulation layer which is positioned on the second main surface via the second laminar electrode, and in which the first insulation layer, the PTC component, and the second insulation layer are laminated in the listed order, wherein:

the laminate has a first end and a second end with respect to a direction perpendicular to a laminating direction, and a first side electrode and a second side electrode are disposed on the first end and the second end, respectively;

the first laminar electrode of the PTC component extends while being separated from the first side electrode and the second side electrode;

the second laminar electrode of the PTC component is separated from the first end, and extends to the second end and is electrically connected to the second side electrode;

at least the first side electrode extends at the first end along an entirety of a thickness direction of the laminate and further extends on a first edge portion of the first insulation layer; and the first edge portion has a through-hole which reaches the first laminar electrode, and the through-hole has an electrically conductive element which electrically connects the first laminar electrode and the first side electrode, characterized in that:

the PTC device comprises the laminate which further comprises at least one other PTC component which comprises an other laminar PTC element defined by a third main surface and a fourth main surface which are facing to each other, a third laminar electrode extending on the third main surface, and a fourth laminar electrode extending on the fourth main surface, and in which the first insulation layer, the PTC component, and the second insulation layer, as well as the at least one other PTC component which is positioned on the second insulation layer, and an other insulation layer adjacent to each of the at least one other PTC component are laminated in the listed order, as a result of which every PTC component is sandwiched by the insulation layers;

wherein:

the third laminar electrode of each of the at least one other PTC component other than the PTC component positioned at the outermost of the laminate is separated from the first end, extends to the second end, and is electrically connected to the second side electrode;

the fourth laminar electrode on the inner side of the PTC component positioned at the outermost of the laminate is separated from the second end, extends to the first end, and is electrically connected to the first side electrode;

the PTC component positioned at the outermost of the laminate has a third insulation layer on the outside of its PTC element via the third laminar electrode, and the third laminar electrode is separated from the first side electrode and the second side electrode;

the fourth laminar electrode on the inner side of the PTC component positioned at the outermost of the laminate is separated from the second side electrode, extends to the first end, and is electrically connected to the first side electrode;

the second side electrode extends at the second end along the thickness direction of the laminate and further extends on the second edge portion of the third insulation layer; and the first edge portion of the third insulation layer has a through-hole which reaches the third laminar electrode, and the through-hole has an electrically conductive element which electrically connects the third laminar electrode and the first side electrode.

6. The PTC device according to claim 5, characterized in that at least one of the laminar PTC elements of the PTC component and the other PTC component is separated from the first side electrode or the second side electrode with an insulation section at the first end or the second end of the laminate.

* * * * *